United States Patent
Bejerstål et al.

(10) Patent No.: US 6,540,449 B1
(45) Date of Patent: Apr. 1, 2003

(54) TOOL FOR CHIP REMOVING MACHINING

(75) Inventors: Per Bejerstål, Gävle (SE); Sven-Erik Carlsson, Gimo (SE)

(73) Assignee: Sandvik Aktiebolag, Sandviken (SE)

( * ) Notice: Subject to any disclaimer, the term of this patent is extended or adjusted under 35 U.S.C. 154(b) by 133 days.

(21) Appl. No.: 09/696,241

(22) Filed: Oct. 26, 2000

(30) Foreign Application Priority Data

Oct. 26, 1999 (SE) .............................................. 9903848

(51) Int. Cl.$^7$ ................................................. B26D 1/12
(52) U.S. Cl. ........................... 407/40; 407/41; 407/119; 407/116; 407/34
(58) Field of Search ..................... 407/40, 41; 409/233; 408/239

(56) References Cited

U.S. PATENT DOCUMENTS

| | | |
|---|---|---|
| 2,379,984 A | 7/1945 | Nereaux |
| 2,936,659 A * | 5/1960 | Garberding |
| 4,209,047 A * | 6/1980 | Weill .................... 144/208.8 |
| 4,406,195 A * | 9/1983 | Kruger et al. .......... 408/239 A |
| 4,484,498 A * | 11/1984 | Kanno et al. ............... 407/112 |
| 4,643,620 A * | 2/1987 | Fujii et al. ................. 407/119 |
| 4,824,274 A * | 4/1989 | von Haas .................... 403/24 |
| 4,836,706 A | 6/1989 | Mitchell |
| 4,964,762 A * | 10/1990 | Arai et al. .................... 407/34 |
| 4,995,766 A * | 2/1991 | Coleman .................... 407/104 |
| 5,183,362 A * | 2/1993 | Kuroyama et al. ......... 407/116 |
| 5,516,242 A * | 5/1996 | Andronica .................... 407/11 |
| 5,607,263 A | 3/1997 | Nespeta et al. |

FOREIGN PATENT DOCUMENTS

| | | |
|---|---|---|
| CH | 446 013 | 3/1968 |
| DE | 34408086 | 12/1991 |
| EP | 911191 | 4/1999 |

* cited by examiner

Primary Examiner—A. L. Wellington
Assistant Examiner—Dana Ross
(74) Attorney, Agent, or Firm—Burns, Doane, Swecker & Mathis, LLP (57) ABSTRACT

A rotatable tool for chip removing machining includes a shaft and a cutting body connected detachably to the shaft by a drawbar. At its front end the drawbar has a locking device for effecting mechanical engagement with the cutting body. The drawbar is axially movable by an actuating element located at a distance from the locking device. Inside the cutting body there is a cavity, which communicates with an opening in a rear part of the cutting body. The opening has a smaller width than the cavity, and the locking device has a larger width than the opening in order to be able to be pressed against an interior rear surface of the cavity of the cutting body after the locking device is inserted into in the cavity.

14 Claims, 8 Drawing Sheets

TOOL FOR CHIP REMOVING MACHINING

TECHNICAL FIELD OF THE INVENTION

This invention relates to a tool intended for chip removing machining the tool being of the type that comprises a shaft, which at a front end has a cutting body made of a hard material, which is connected detachably to the shaft by means of a drawbar arranged in a bore inside the shaft. The drawbar, at a front end thereof, has a locking device for mechanical engagement with the cutting body and which is movable axially between a protruded position and a retracted position by means of a tightening element located at a distance from the locking device.

PRIOR ART

Cutting tools of the type that makes use of a cutting body detachable from a shaft may, in practice, be in the form of milling cutters, in particular shank-type cutters, drills or thread cutters, the shaft usually having a long narrow, cylindrical shape. In modern machine tools, said shafts are so sophisticated and expensive that they cannot, for economical reasons, be integrated with the wearing part of the tool, viz. the cutting body, while forming a single tool which may be discarded when the cutting body has been consumed. In other words, it is profitable to make the cutting body proper as a detachable unit, which may be replaced, while the expensive shaft may be used during a long period of time. A certain category of such tools (see e.g., U.S. Pat. No. 5,607,263 and German Document 34 48 086) is based on the cutting body being fastened at the front end of the shaft by means of a short screw, which via a through hole in the cutting body is fastened in a female screw thread which opens up at the front end of the shaft. An aggravating disadvantage of this type of tool is, however, that cutting edges cannot be formed in the area of the front end of the hole formed in the cutting body, from which it follows that the cutting body may be formed only for milling (e.g. milling of T-grooves), but not for drilling.

Another category of tools, to which the invention relates, uses a drawbar of the type mentioned initially in order to connect, detachably, the cutting body to the shaft. The front end of the drawbar may then be inserted from behind in the cutting body and by means of a locking device be brought into mechanical engagement with the cutting body. In this way, the front end of the cutting body will not be intersected by any holes, and therefore cutting edges for drilling purposes or full radius edges for milling purposes may be formed on the front end of the cutting body. A tool employing a drawbar of this type has been described in EP 0 911 101. In this known tool, a drawbar extends through a through-bore inside the tool shaft and is connected, at a rear end, to a nut by means of which the bar may be displaced axially inside the shaft between a protruding position, in which the cutting body may be connected to the front end of the drawbar, and a withdrawn position in which the cutting body is clamped against the front end of the shaft, more precisely by means of a locking device at the front end of the drawbar.

However, in this known tool, the locking between the cutting body and the shaft is unreliable. That is, the locking device consists of a ring-like bulge formed on the front end of the drawbar which interacts with an inner, cone-shaped surface on a neck protruding from the shaft, which in turn is inserted into a rearwardly open, cylindrical space in the cutting body, said neck expanding when the ringlike bulge of the drawbar is pulled therein; all while achieving a friction locking between the inside of said cylinder space and the outside of said neck. If a tool of this type is exposed to considerable cutting forces, there is, however, a risk of the cutting head coming loose from the shaft or displaced from a centered position thereon.

AIMS AND FEATURES OF THE INVENTION

The present invention aims at obviating the above-mentioned inconveniences of the prior art and at providing an improved tool of the type mentioned initially. Thus, a primary aim of the invention is to provide a tool, the cutting body of which may be corrected to an appurtenant shaft in an accurate and reliable way. Another aim of the invention is to create a tool, which enables assembly and disassembly of the cutting body in a fast and simple way while ensuring an exact centering or positional determination of the cutting body in relation to the shaft. It is also an aim to provide a tool, which is structurally simple and may be manufactured by means of conventional manufacturing methods.

According to the invention, at least the primary aim is attained by a tool for chip removing machining which comprises a shaft having a front end and a bore extending through the shaft and the front end. A cutting body, formed of a harder material than the shaft, is removably disposed at the front end of the shaft. The cutting body includes a rear end facing the front end of the shaft, and a cavity formed in the cutting body. The rear end of the cutting body includes an opening which communicates with the cavity. The opening has a smaller cross-section than the cavity. A drawbar is arranged in the bore of the shaft. The drawbar includes a front end sized to pass through the opening. The front end of the drawbar has a locking device removably disposed within the cavity. The locking device is sized to bear against an interior rear surface of the cavity to prevent removal of the cutting head from the drawbar. An actuating element is operably connected to the drawbar for moving the drawbar axially along the bore for selectively moving the rear end of the cutting body into and out of engagement with the front end of the shaft.

BRIEF DESCRIPTION OF THE DRAWINGS

The objects and advantages of the invention will become apparent from the following detailed description of preferred embodiments thereof in connection with the accompanying drawing, in which like numerals designate like elements, and in which.

DETAILED DESCRIPTION OF PREFERRED EMBODIMENTS OF THE INVENTION

Figure 1:
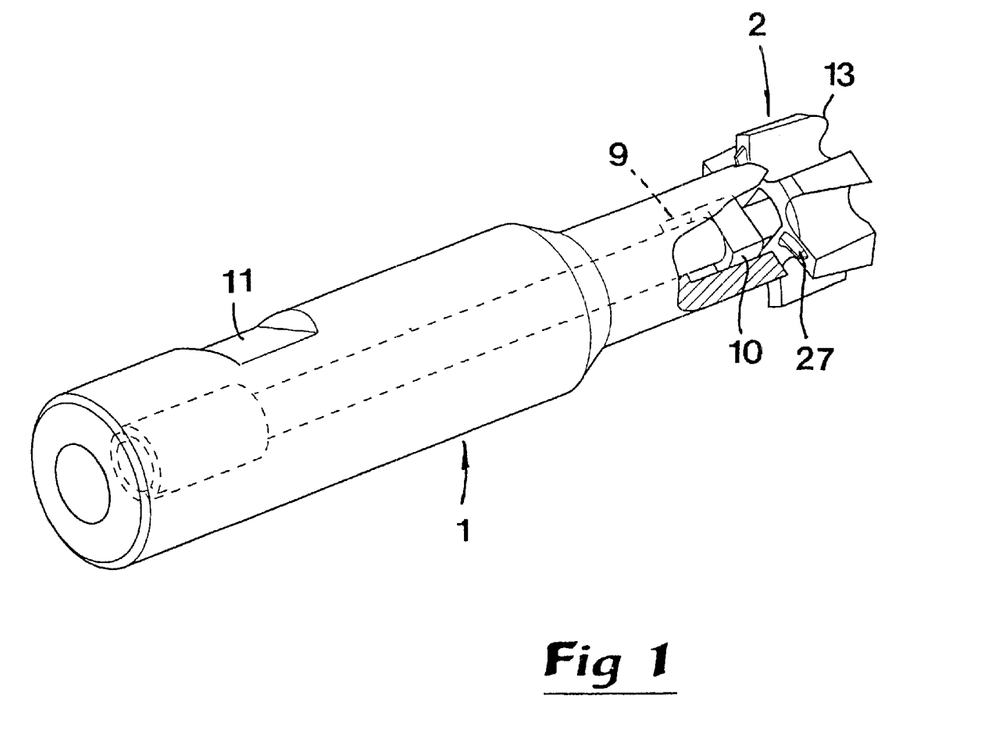
FIG. 1 is a partially sectioned perspective view showing a tool according to the invention intended for milling.

In FIGS. 1–10, a tool in the form of a shank-type cutter is illustrated, which includes a shaft I and a cutting body in the shape of a cutting head 2, which is detachably mounted on a front end of the shaft. Inside the shaft, an axial and central through bore 3 extends, which receives a drawbar 4. The bore 3 widens in a rear cylinder cavity 5, which houses an actuating element in the form of a nut 6, which with the female screw thereof is in engagement with a male screw 7 on the rear portion of the drawbar 4. At the transition section between the bore 3 and the wider cylinder cavity 5, there is a ring-shaped abutment surface 8 against which the front end of the nut 6 is pressed. At the front end of the shaft 1, adjacent to the bore 3, there is a number of axial grooves 9 in which chambers 10 on the drawbar 4 engage in order to make turning of the drawbar impossible relative to the shaft. In other words, the drawbar 4 is axially movable in relation to the shaft, but not turnable in relation thereto. As is seen in FIG. 1, a countersink with a flat bottom surface 11 is formed in the envelope surface of the shaft 1, which ensures a rigid connection between the shaft and an interacting tool holder. It should be noted that the shaft 1 in this case is formed with a rear part, which is thicker than the front part onto which the cutting head 2 is mounted. The diameter of the cutting head is larger than the diameter of at least the front, thin part of the shaft.

In the embodiment exemplified, in which the tool is in the form of a shank-type cutter, the head 2 has a number of tooth-like projections 12, which each have a cutting edge 13. In the example, the number of projections 12 amounts to six, the individual projections protruding approximately radially from a central portion 14 of the body. In practice, the central portion 14 and the projections 12 are manufactured in the form of a single integrated body of conventional cemented carbide, which is produced by pressure molding and sintering. In practice, powdered wolfram carbide is usually mixed and pressure-molded together with one or more binder metals, e.g. cobalt and then the pressed body is sintered. However, it is also feasible to make the head of other hard materials, which in a suitable way are workable.

Figure 6:
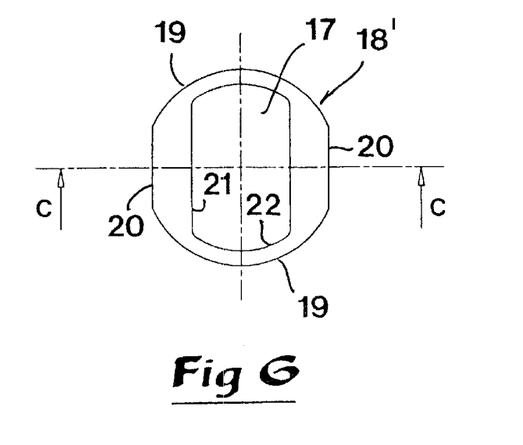
FIG. 6 is an end view of a wall plate included in the cutting head according to FIG. 4.
Figure 7:
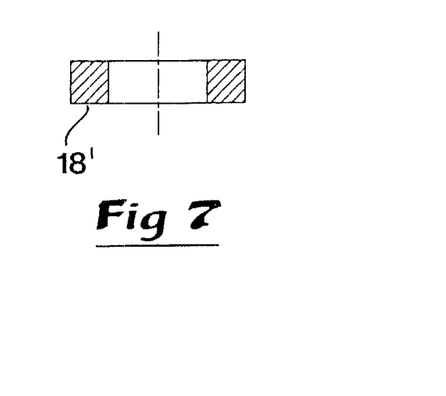
FIG. 7 is a cross-section C—C in FIG. 6.

Now reference is made especially to FIGS. 4–7, which illustrate how a cavity 15 is formed inside the central body 14. At a front end thereof, said cavity 15 is closed, more precisely by means of a front part 16 of the central portion 14 of the body. At the opposite, rear end thereof, the cavity 15 is open, more precisely via an opening 17, which is formed in a rear cross wall 18, which constitutes an integrated part of the cutting head as explained below. As is clearly seen in FIG. 5, the cavity 15 has a generally larger maximum width than the opening 17. This means that the cutting head cannot be made in a single pressure molding operation. In order to solve this problem, the wall 18 together with the opening 17 positioned therein are formed by means of a separate, substantially ring-shaped plate 18' of the type that is shown in FIGS. 6 and 7. This plate 18' is pressure molded as a separate first unit without being sintered, and the body 14 and the appurtenant projection 12 are pressure molded together to form a separate second unit, also without being sintered. Then the first and second units are put together, after which sintering is executed. Thus, after the sintering has been completed, the plate 18' forms the wall 18 integrated into the cutting head 2 in its entirety.

In FIG. 6 it can be seen that the pressure molded plate 18' externally has two opposite, circular envelope portions 19 and two opposite, planar envelope portions 20. The rear part of the cavity 15 that receives the plate 18' has the same profile, i.e. comprises two planar opposite surfaces. By means of these planar surfaces, the opening 17 has its position determined in an exact way in relation to the body 14. As is furthermore seen in FIG. 6, the opening 17 has a generally out-of-round profile. More precisely, the opening is elongated and is delimited by two planar long side surfaces 21 and two curved end surfaces 22. As for the cavity 15, it should be pointed out that it is to advantage if the same is delimited by three different partial surfaces, viz. a cylindrical surface 15a located closest the wall 18, a cone-shaped surface 15b located at the front end of the cavity, and a frusto-conical surface 15c located between the surfaces 15a and 15b. By means of the decreasing cross-sections of the conical and frusto-conical surfaces 15b, 15c, it is ensured that the material forming the front end of the cutting head is strongly dimensioned.

Figure 8:
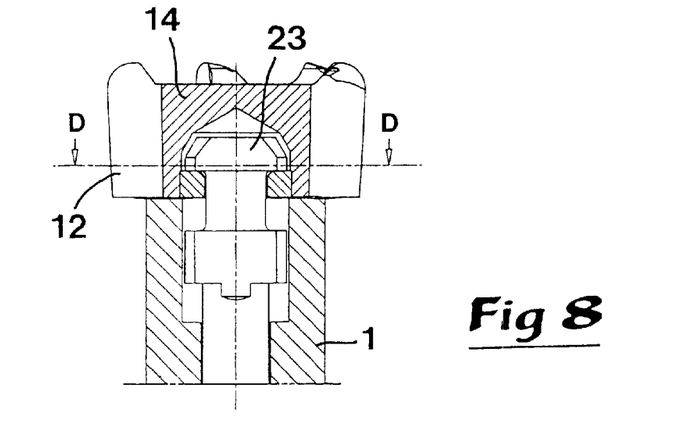
FIG. 8 is an enlarged longitudinal section showing the cutting bead and a front portion of the shaft of the tool.
Figure 9:
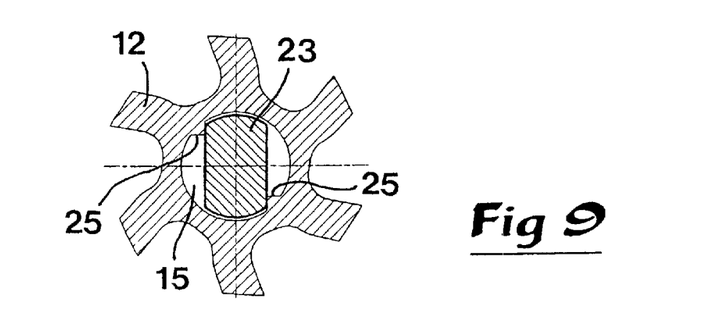
FIG. 9 is a section D—D in FIG. 8, the cutting bead being shown in a first angular position of rotation in relation to the shaft and a drawbar arranged therein.
Figure 10:
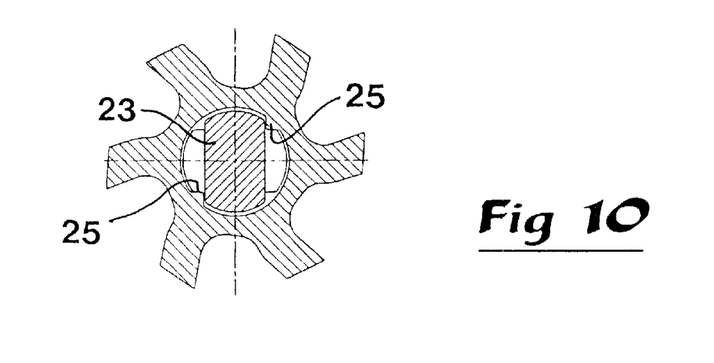
FIG. 10 is a cross-section corresponding to FIG. 9, but showing the cutting head turned 90° in relation to the position according to FIG. 9.

At the front end thereof (see FIG. 2), the drawbar 4 is formed with a locking device 23, which like the opening 17 has an out of round shape and forms a bayonet type of coupling therewith. It is to advantage if the locking device has a profile that is congruent with the profile of the opening 17, although the locking device is somewhat smaller. In this way, the locking device 23 may be inserted axially through the opening 17, more precisely at an angular position of rotation at which the locking device and the opening are flush with each other. When the locking device has been inserted into the cavity 15, the cutting head may be turned so that the locking device assumes another, opposing angular position of rotation in which the two opposite ends of the locking device may be pressed against the interior rear surface 24 of the cavity 15 defined by the wall 18. As is seen in FIGS. 8–10, two stopping elements 25 in the form of shoulders are formed on the interior surface 15a of the cavity 15, which elements are so placed that the cutting head may be turned exactly 90° from the angular position of rotation illustrated in FIG. 9 in which the locking device may be inserted through the opening 17, to the locking angular position of rotation which is illustrated in FIG. 10.

As is seen in FIGS. 1–4, a number of, more precisely three, male elements 27 are formed on the rear end surface 26 of the cutting head, each of which elements interacts with corresponding female elements in the form of countersinks 28 (see FIG. 3) formed in the front end surface 29 of the shaft 1. The male elements 27 as well as the countersinks 28 advantageously have a wedge-type tapering shape, and the countersinks are somewhat deeper than the male elements so that the male elements cannot touch the bottom of the countersink. When the male elements engage the countersinks, a robust, rigid torque-transmitting connection between the cutting head and the shaft is ensured. It should be noted that the three male elements 27, which like the countersinks 28 are equidistantly spaced-apart, are located opposite the countersinks when the cutting head has been turned to the angular position of rotation in which the locking device 23 has been pressed against the stopping elements 25 according to FIG. 10.

The Function of the Tool According to the Invention

When a cutting head 2 is to be assembled on the shaft 1, the drawbar 4 is brought to protrude a suitable distance from the front end of the shaft surface 29. This is something that is achieved by screwing the nut 6 a few turns rearwards along the drawbar. In the next step, the cutting head is threaded onto the free end of the drawbar, more precisely by pushing the locking device 23 through the elongate opening 17 in the state which is shown in FIG. 9. After this, the cutting head is turned 90° to the position illustrated in FIG. 10 in which the locking device is pressed against the stopping elements 25 at the same time as the three male elements 27 are located opposite the appurtenant countersinks 28 in the front end of the shaft surface. When this has taken place, the drawbar 4 is drawn into the shaft by screwing the nut 6 forwards on the drawbar. When the nut is screwed fast, the male elements 27 are wedged in the appurtenant countersinks thus achieving a strong, rigid connection between the cutting head and the shaft.

At disassembly, the above-described steps are reversed.

In this connection, it should be mentioned that it is to advantage if the drawbar 4 is spring-activated in order to project automatically from the front end of the shaft when the nut 6 is screwed rearwards. An elastic ring, e.g. an O-ring, may for instance be applied in the area behind the nut 6 which ring always aims to force the nut—and thereby the drawbar—in the forward direction.

Figure 2:
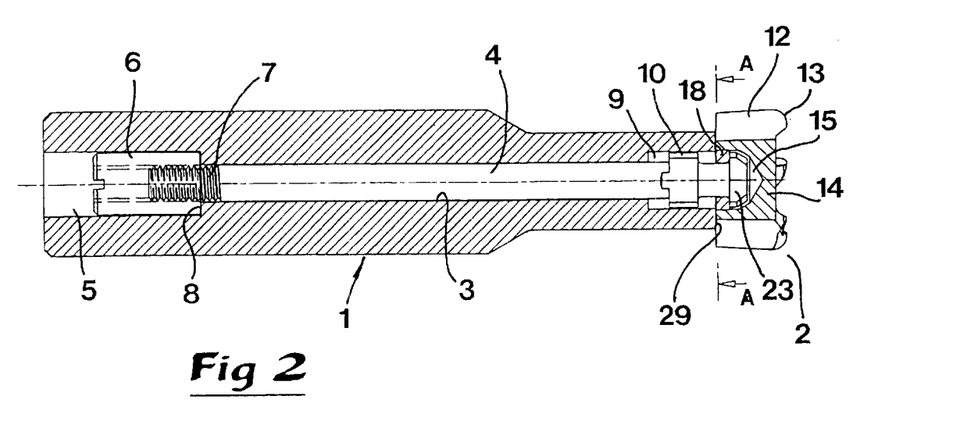
FIG. 2 is a longitudinal section through the tool according to FIG. 1.
Figure 3:
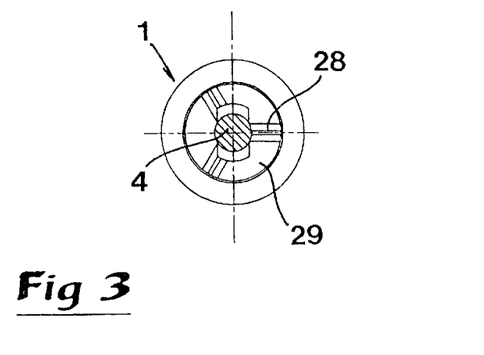
FIG. 3 is a section A—A in FIG. 2.
Figure 4:
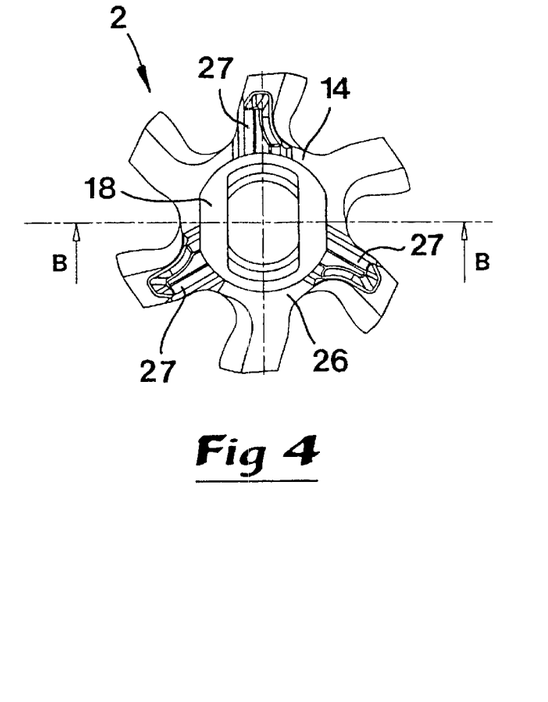
FIG. 4 is an end view of a cutting body included in the tool, in the form of a cutting head.
Figure 5:
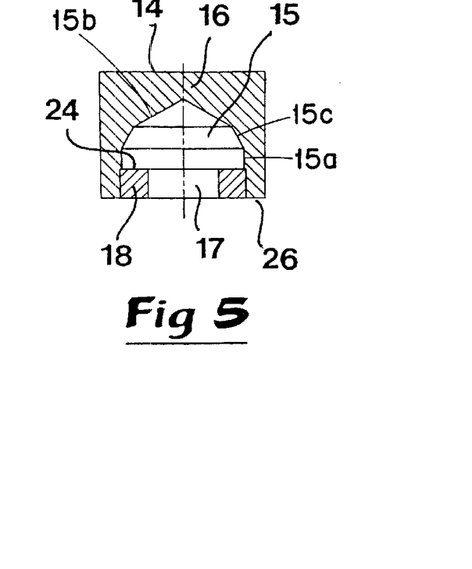
FIG. 5 is a section B—B in FIG. 4.
Figure 11:
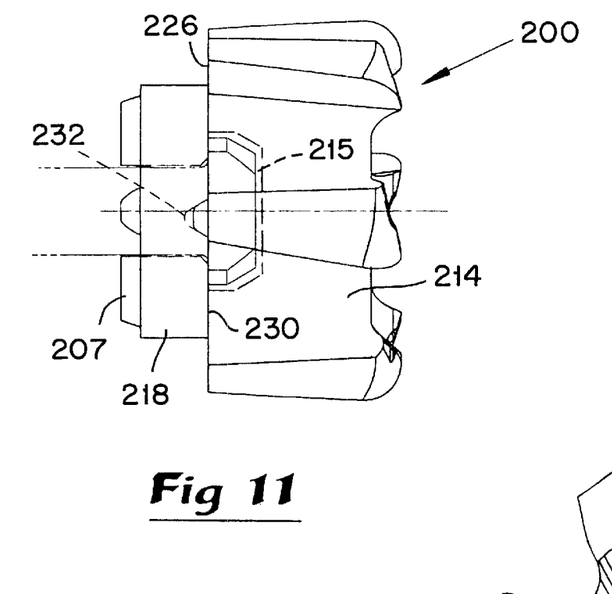
FIG. 11 is a side view of an alternative embodiment of the cutting head of the tool.
Figure 12:
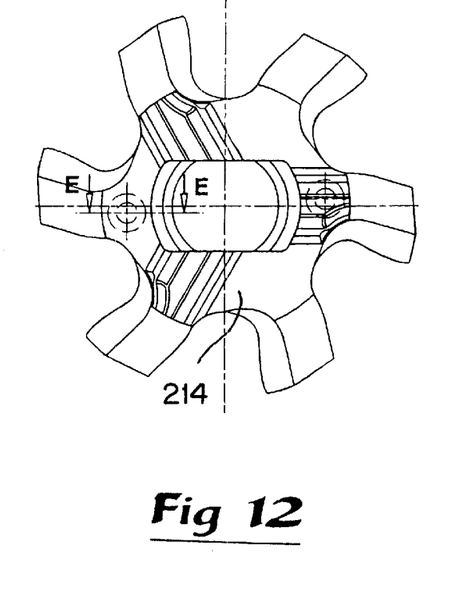
FIG. 12 is an end view of the cutting head according to FIG. 11.
Figure 13:
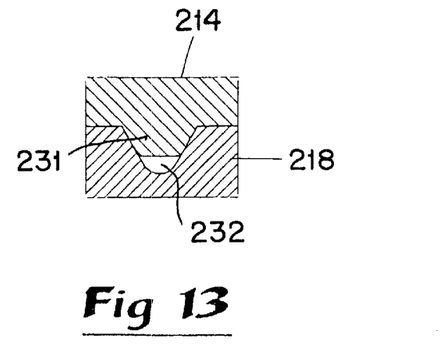
FIG. 13 is a partial cross-section E—E in FIG. 12.

Reference is now made to FIGS. 11–13, which illustrate an alternative embodiment of a cutting head 200. The elements in FIGS. 11–13 which correspond to those of FIG. 2 are given the same reference numerals, increased by two hundred. The plate 218 of the cutter head 200 is not countersunk inside the cavity 215, but rather has a front surface 230 bearing against the rear end surface 226 of the center portion 214 of the cutting head. Also in this embodiment, the center portion 214 of the cuffing head and the plate 218 are individually pressure-molded before finally being integrated with each other by being sintered together. In this connection, in order to determine the position of the plate 218 in relation to the central portion 14, one or more projections 231 having a frusto-conical shape may initially be formed on one of said units (e.g., the cutting head 200) which are brought into engagement with one or more cone-shaped seats 232 in the second unit (e.g., the plate 218), however, without touching the bottom of said seats. Since the wall-forming plate 218 in the embodiment according to FIGS. 11–13 may be given a larger diameter than the retracted wall plate 18 in the previous embodiment, a larger contact surface between the cutting head and the shaft is obtained. In addition, a larger surface of the contact zone in which the sintering takes place is also obtained.

Figure 14:
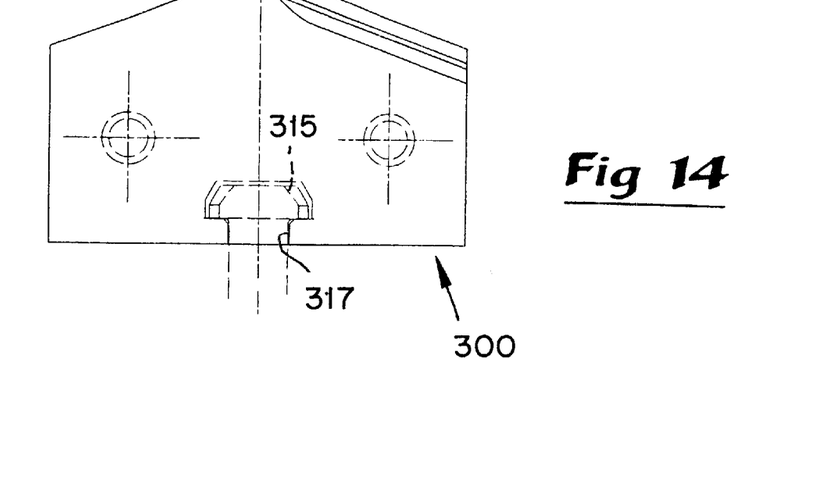
FIG. 14 is a side view of an additional alternative embodiment of a cutting body for drilling purposes.
Figures 15, 16:
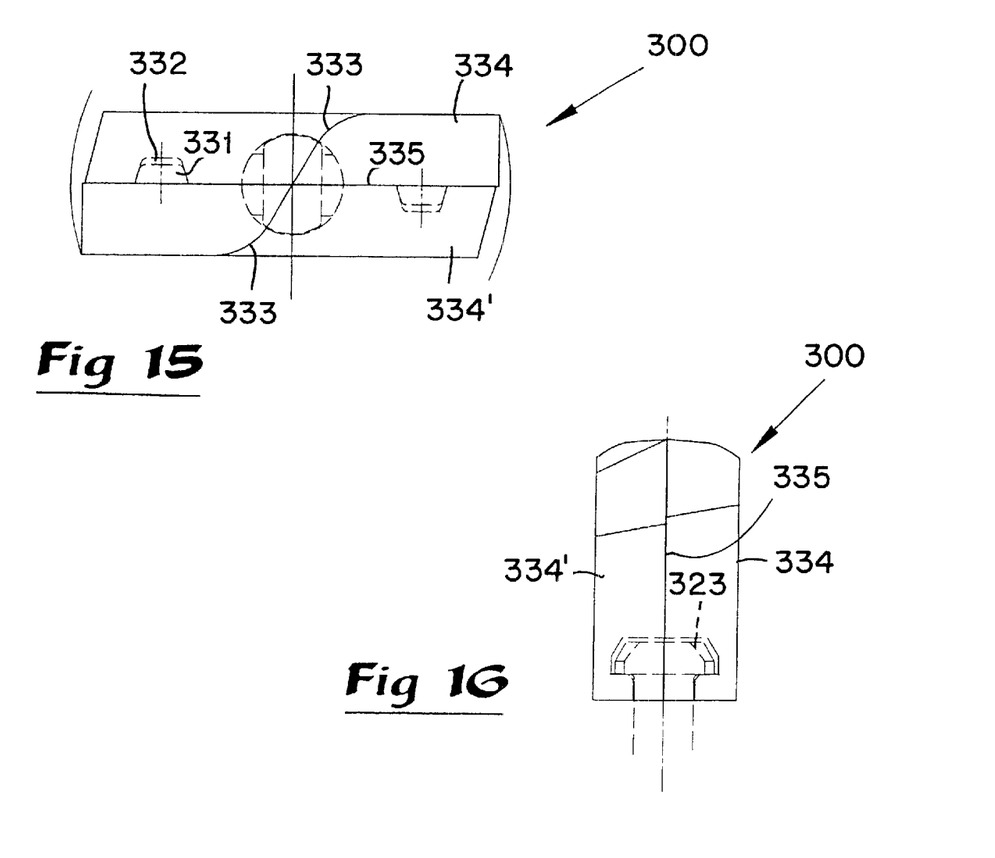
FIG. 15 is an end view from above of the cutting body according to FIG. 14.
FIG. 16 is a side view of the cutting body in 90° angle to the side view according to FIG. 14.

How the tool according to the invention may be made with a head or cutting body 300 for drilling purposes is shown schematically in FIGS. 14–16. The elements corresponding to those of FIG. 2 are given the same reference numerals increased by three hundred. In this case, the cutting body 300 is formed with cutting edges 333 in the area of a front, tip-like end. Also in this case, the cutting body includes a cavity 315 which is open via an opening with an out of round, preferably elongated profile, and a locking device 323 with a congruent profile being insertable in the cavity. However, in this case the cutting body is composed of two similarly shaped, mirror-image halves 334, 334' that are sintered along a planar interface 335 which contains the axis of rotation. In the interface between the two halves that are sintered together after pressure molding, it may be advantageous to form inter acting pairs of projections and seats 331 and 332, respectively, of the type described previously.

Figure 17:
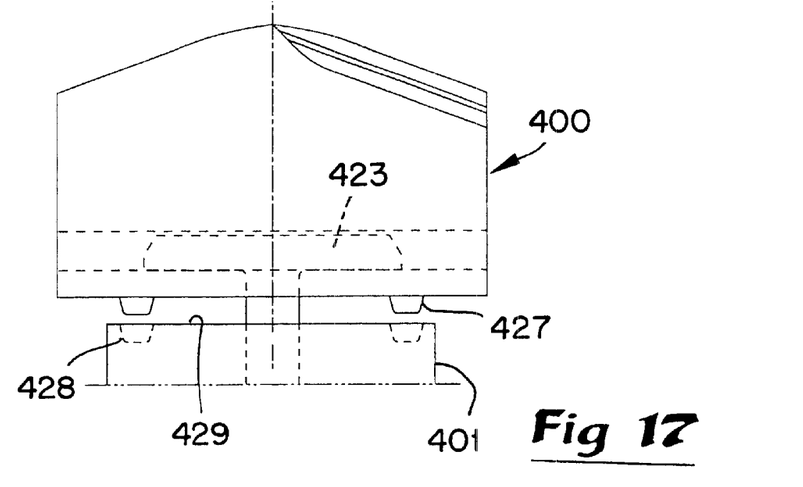
FIG. 17 is a side view of an additional alternative embodiment of a cutting body for drilling together with an appurtenant shaft.
Figure 18:
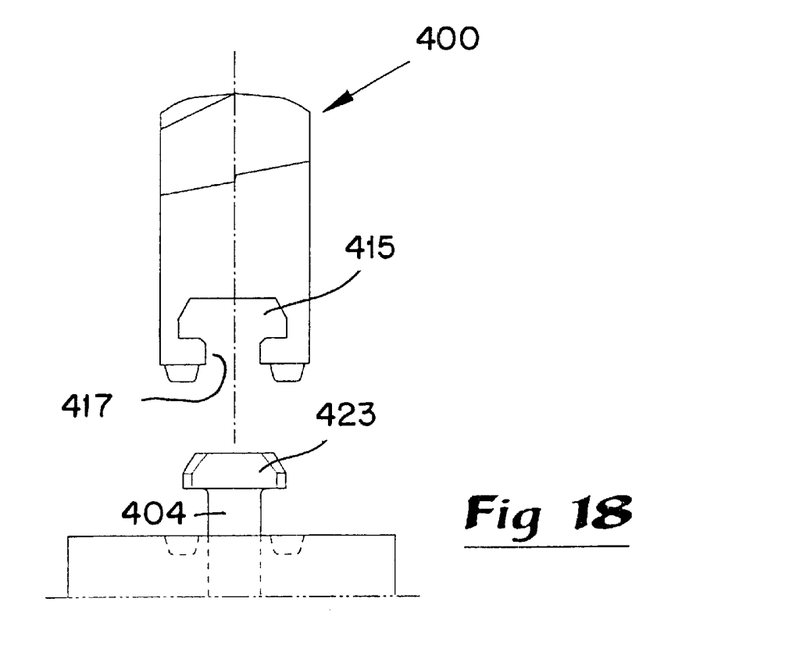
FIG. 18 is a side view in 90° angle to the side view according to FIG. 17.

In FIGS. 17 and 18, an additional alternative embodiment is shown, according to which the cavity in a cutting body 400 intended for drilling consists of a laterally open, first channel 415, while the opening to this channel consists of a laterally open second channel 417, which is narrower than the channel 415. The locking device 423 existing on the drawbar 404 of the shaft has an elongated shape and a width that is larger than the width of the channel 417. In this case, the locking device is brought into the cavity 415 from the side and is centred by means of cone-shaped shoulders or male elements 427, which engage cone-shaped countersinks 428 in the front surface 429 of the shaft 401. In the example shown, the two channels 415, 417 are open at opposite ends. However, it is also feasible to form the cutting head so that the channels open only towards one side. In the example according to FIGS. 17 and 18, the cavities/openings 415, 417 extend parallel to the flat plate of the cutting body, i.e. from short side to short side. It is, however, also feasible to locate channels perpendicularly to the planar of the cutting body, i.e. from long side to long side.

Figures 19, 19A:
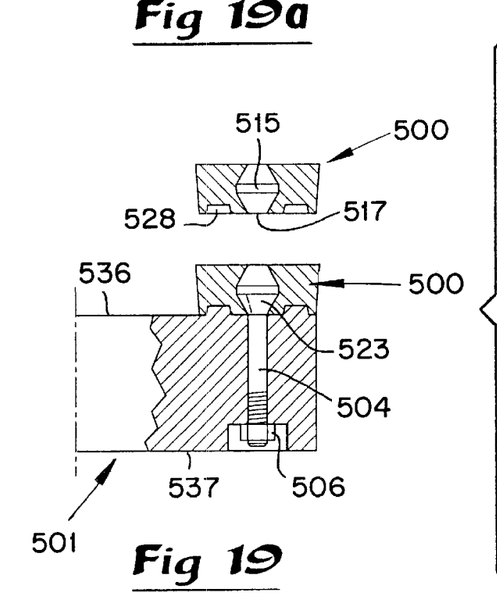
FIG. 19 is a partial longitudinal section through another alternative tool for turning purposes, the cutting body of the tool being shown in a locked position.
FIG. 19a is a sectional view of the cutting body shown in FIG. 19.
Figure 20:
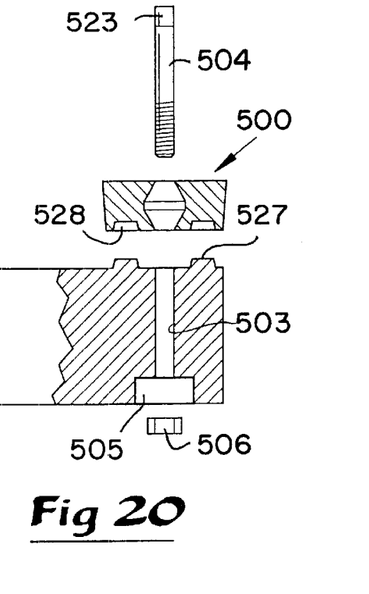
FIG. 20 is a longitudinal section corresponding to FIG. 19 showing the cutting body in a released state.
Figure 21:
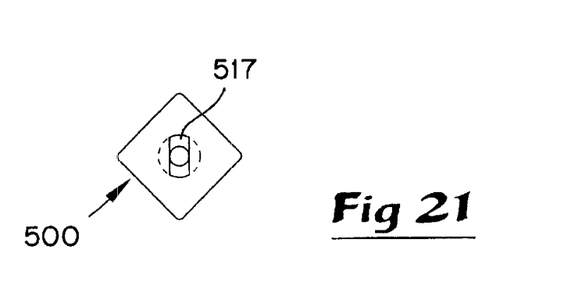
FIG. 21 is a planar view showing the cutting body included in the tool according to FIGS. 19–20.

Reference is now made to FIGS. 19–21, which illustrate a tool according to the invention intended for turning. In this case, the cutting body 500 consists of a cutting insert for a turning lathe with a flat basic shape, which is placed in the immediate vicinity of the front end of the shaft 501, more precisely on one of the two opposite sides 536, 537 of the shaft. In this embodiment, the bore 503 for the drawbar 504 extends transversely to the longitudinal axis of the shaft, more precisely all through from the first side 536 to the second side 537. The cavity 515 inside the cutting body 500 is delimited by two cone surfaces diverging towards each other between which there may be a cylindrical surface. The locking device 523 of the drawbar 504 consists, in this case, of a head having an elongated basic shape, which is delimited by two opposite, planar, side surfaces which extend in the longitudinal direction of the head, as well as two partial cone-shaped end surfaces between the planar surfaces.

Like the embodiments according to FIGS. 1–13, the cavity 515 opens in an opening 517 having an elongate shape. Therefore, the head 523 may be inserted into the cavity and be turned 900 before locking of the cutting body.

Also in this case, the drawbar 504 interacts with a nut 506 being insertable in a cavity 505 at a rear end of the bore 503.

In order to ensure a rigid connection between the cutting body 500 and the shaft 501, there maybe a suitable number of pairs of inter acting male and female elements 527, 528 In the interface between the cutting body and the contact surface 536 of the shaft which elements intermesh with each other when the nut 506 tightens the drawbar.

Figure 22:
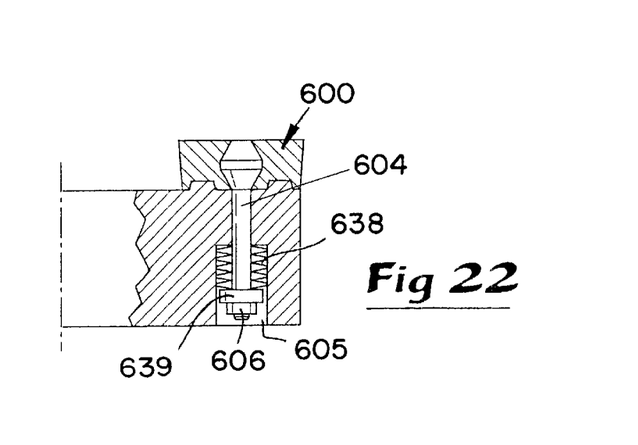
FIG. 22 is a partial longitudinal section illustrating an additional, alternative turning tool.

In FIG. 22, an alternative embodiment is shown which is similar to that of FIGS. 19–21 except that the drawbar 604 is spring-activated. More precisely, a pressure spring 638 is arranged between, on the one hand, an abutment surface at the inner end of the cavity 605 and a washer 639 adjacent to the nut of the drawbar. In this embodiment, the cutting body 600 may be loosened by the simple measure of inserting the drawbar a distance in the appurtenant bore against the action of the spring 638, i.e. without needing to manipulate the nut 606.

A primary advantage of the tool according to the invention is that the cutting head may, in a reliable way, be rigidly connected to the shaft, and assembly as well as disassembly of the cutting head may be carried out in a fast and simple way.

Feasible Modifications of the Invention

The invention is not solely restricted to the embodiments described and illustrated in the drawings. Thus, not only the cutting body but also the part of the tool holding the cutting body may be modified very considerably within the scope of the subsequent claims. Therefore, the concept "shaft" should be interpreted in the widest sense, so far that the shaft not necessarily has to have a marked long narrow shape. In particular, the shape of the shaft may be altered to a far-reaching extent when the tool is formed for turning purposes.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A tool for chip removing machining, comprising:
   a shaft having a front end and a bore extending through the shaft and the front end;
   a cutting body removably disposed at the front end of the shaft and including integral front and rear ends, the cutting body formed of a harder material than the shaft, the rear end facing the front end of the shaft, and the front end of the cutting body facing away from the front end of the shaft, a cavity formed in the cutting body, and the front end of the cutting body including an integral cutting edge, the rear end including an opening communicating with the cavity, the opening having a smaller cross-section than the cavity;
   a drawbar arranged in the bore of the shaft, the drawbar including a front end sized to pass through the opening, the front end of the drawbar having a locking device removably disposed within the cavity, the locking device being sized to bear against an interior rear surface of the cavity to prevent removal of the cutting head from the drawbar; and
   an actuating element operably connected to the drawbar for moving the drawbar axially along the bore for selectively moving the rear end of the cutting body into and out of engagement with the front end of the shaft.

2. Tool according to claim 1, wherein the opening comprises a central opening with an out of round cross-sectional shape, the locking device having an out of round shape, the cutting body being turnable in relation to the locking device between a first angular position to permit the locking element to pass through the opening and enter the cavity, and a second angular position in which the locking element bears against the interior rear surface of the cavity.

3. Tool according to claim 2, wherein at least one stopping element is formed inside the cavity and arranged to be engaged by the locking element when the cutting body is turned out of the one orientation.

4. Tool according to claim 3, wherein the stopping element is located inside the cavity to enable the cutting body to turn 90° from a first angular position of rotation to a second angular position of rotation.

5. Tool according to claim 1 wherein the rear end of the cutting body includes one of a male element and female element, and the front end of the shaft includes the other of the male element and female element, the male and female elements being in mutual engagement to create a rigid connection between the cutting body and the shaft when the actuating element is actuated to move the drawbar to bring the rear end against the front end.

6. Tool according to claim 1 wherein the cutting body is composed of at least two parts which are sintered together.

7. Tool according to claim 6 wherein the cutting body is made of cemented carbide.

8. Tool according to claim 6, wherein one part of the cutting body comprises a central portion which is closed at a front end thereof and in which the cavity is formed, and another part of the cutting body comprises a plate which extends transversely to the axis of the bore and in which the opening is formed.

9. Tool according to claim 8, wherein the cutting body comprises two similarly shaped, mirror-image halves, which are sintered together along an interface.

10. Tool according to claim 9, wherein the interface comprises first and second surfaces formed on respective ones of the halves, the first surface including a projection received in a seat formed in the second surface.

11. Tool according to claim 1, wherein each of the locking device and the opening have an elongated shape.

12. Tool according to claim 1, wherein the cavity comprises a laterally open first channel, while the opening comprises a laterally open second channel having a width smaller than a width of the first channel.

13. Tool according to claim 1, wherein the tool constitutes a turning tool, the bore extending transversely to a longitudinal direction of the shaft.

14. Tool according to claim 13, wherein the drawbar is actuated by at least one spring for biasing the cutting body against the front end of the shaft.

* * * * *